Figure 1:
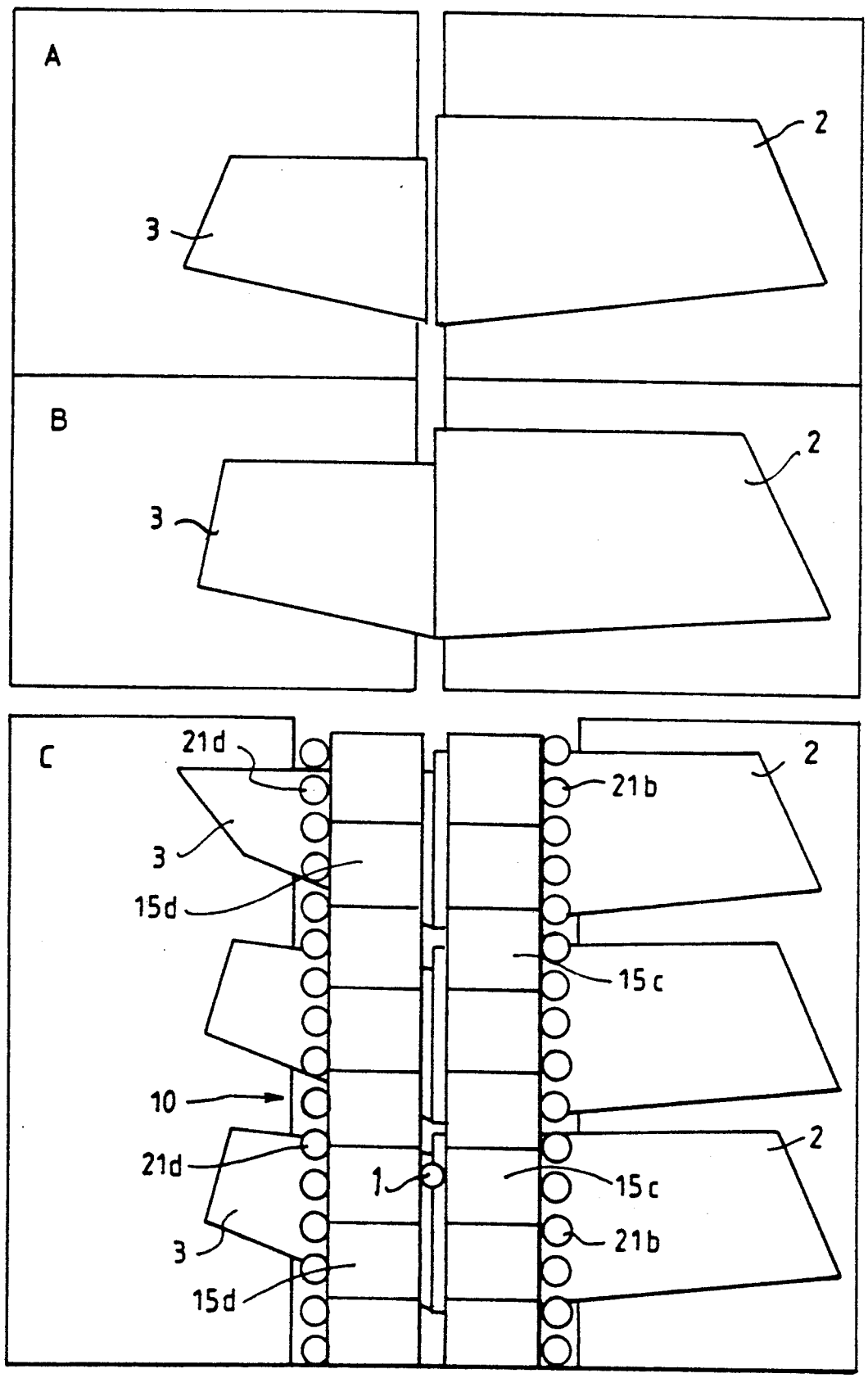

United States Patent [19]

Sauvage et al.

[11] Patent Number: 5,276,304
[45] Date of Patent: Jan. 4, 1994

[54] DEVICE FOR GUIDING AND FOR TRANSFER OF AT LEAST TWO SHEET METAL BLANKS TO BE WELDED

[75] Inventors: Francis Sauvage; Gilles Peru, both of Dunkerque; Yvon Le Roy, Le Doulieu; Charles Sion, Camphin-en-Carembault, all of France

[73] Assignee: Sollac, Puteaux, France

[21] Appl. No.: 990,275

[22] Filed: Dec. 14, 1992

[30] Foreign Application Priority Data

Dec. 20, 1991 [FR] France .................. 91 15936

[51] Int. Cl.⁵ .............................. B23K 26/00
[52] U.S. Cl. .................. 219/121.63; 219/121.82; 219/107
[58] Field of Search ............... 219/121.63, 121.64, 219/121.82, 107, 102; 228/4.1

[56] References Cited

U.S. PATENT DOCUMENTS 4,733,815  3/1988  Sturm .

FOREIGN PATENT DOCUMENTS 0234346  9/1987  European Pat. Off. .
0299358  1/1989  European Pat. Off. .
0438612  7/1991  European Pat. Off. .

Primary Examiner—C. L. Albritton
Attorney, Agent, or Firm—Oblon, Spivak, McClelland, Maier & Neustadt

[57] ABSTRACT

The present invention has as its subject a device for guiding and for transfer of at least two sheet metal blanks to be welded edge to edge.

The device comprises, on the one hand, for each sheet metal blank, means (14a, 15a) for supporting the sheet metal blank along a horizontal reference plane and movable horizontally in the direction of a laser beam and means (14c, 15c) for vertical pressing of the sheet metal blank onto the support means and movable horizontally in synchronisation with the said support means for the movement by adherence of the sheet metal blanks and, on the other hand, means for maintaining in reference along a vertical plane the edge to be welded of one of the sheet metal blanks in the axis of the laser beam and means for placing under lateral pressure the edges to be welded of the two sheet metal blanks.

The invention applies to installations for welding by laser beam sheet metal blanks of different geometrical shapes and/or of different thicknesses for example for the automobile industry.

19 Claims, 4 Drawing Sheets

DEVICE FOR GUIDING AND FOR TRANSFER OF AT LEAST TWO SHEET METAL BLANKS TO BE WELDED

The present invention has as its subject a device for guiding and for transfer of at least two sheet metal blanks to be welded edge to edge, particularly in an installation for welding by laser beam two sheet metal blanks of different geometrical shapes and/or of different thicknesses, for example for the automobile industry or the user industries of semi-finished parts.

In order to weld two sheet metal blanks edge to edge it is known for them to be joined and for the joint plane of the said blanks to be submitted to a beam while causing these sheet metal blanks to move past continuously perpendicularly to the axis of the laser beam.

In a general way, these welding installations comprise a zone for lateral positioning of one of the sheet metal blanks with respect to the axis of the beam, then a zone for bringing the two sheet metal blanks alongside one another edge to edge and lastly a zone for maintaining the two sheet metal blanks edge to edge and for feeding these blanks underneath the laser beam.

To this effect, various devices are known for maintaining the sheet metal blanks in the welding zone which use for each sheet metal blank systems for vertical clamping together constituted for example by rollers.

But, this kind of maintaining device does not permit the welding together of sheet metal blanks of different geometrical shapes.

A maintaining device is also known which comprises pairs of plates, one beside the other, each bearing at least one sheet metal blank.

The plates are brought onto a stop against which the base sides of the sheet metal blanks are guided so as to align the frontal edges of the said blanks.

The sheet metal blanks are attached for example by clamping onto the plates. This device also comprises, at the level of the welding zone sloping pressure rollers in order to hold the sheet metal blanks by the top.

This known device has a disadvantage which resides mainly in the fact that it does not permit the clearance to be reduced between the edges to be welded of the two sheet metal blanks with the result that at the moment of the welding, the clearance increases because of the expansion of the sheet metal blanks, thus giving rise to welds of poor quality.

The present invention has the aim of avoiding these disadvantages by proposing a device which makes it possible to control the clearance between the edges to be welded of the two sheet metal blanks in the course of their movement throughout the welding operation.

The present invention therefore has as its subject a device for guiding and for transfer of at least two sheet metal blanks to be welded edge to edge, particularly in an installation for welding by laser beam, characterised in that it comprises, on the one hand, for each sheet metal blank, means for supporting the sheet metal blank along a horizontal reference plane and movable horizontally in the direction of the laser beam and means for vertical pressing of the sheet metal blank onto the support means and movable horizontally in synchronisation with the said support means for the movement by adherence of the sheet metal blanks and, on the other hand, means for maintaining in reference along a vertical plane the edge to be welded of one of the sheet metal blanks in the axis of the laser beam and means for placing under lateral pressure the edges to be welded of the two sheet metal blanks.

According to other features of the invention the support means are formed by a chain with articulated pads constituting an area of continuous contact with the lower surface of the corresponding sheet metal blank and by rollers free in rotation supporting the corresponding chain with pads, the axis of rotation of the said rollers being perpendicular to the direction of movement of the chain with pads and horizontal, the vertical pressure means are formed by a chain with articulated pads constituting an area of continuous contact with the upper surface of the corresponding sheet metal blank and by rollers free in rotation for pressing the chain with pads onto the said upper surface, the axis of rotation of the said rollers being perpendicular to the direction of movement of the chain with pads and horizontal, at least three rollers are in contact simultaneously with a pad of each chain with pads, each chain with pads forms a loop in a plane perpendicular to the said sheet metal blanks and comprises means for driving in rotation, the driving means of each chain with pads are formed by motive rollers interposed between the said support or pressing rollers, at least one motive roller being in contact with a pad, the motive rollers comprise a pinion meshing with a rack provided on the surface of the pads opposite to the surface in contact with the sheet metal blank, each pad comprises on its surface in contact with the corresponding sheet metal blank a layer of a material ensuring a coefficient of friction sufficient to create adherence with the sheet metal blank, for example a polymer, the means for maintaining in reference along a vertical plane the edge to be welded of one of the sheet metal blanks and the means for placing under lateral pressure the edges to be welded of the two sheet metal blanks are disposed on either side of the joint plane of the sheet metal blanks and each interact with one of these sheet metal blanks, the means for maintaining in reference along a vertical plane the edge to be welded of one of the sheet metal blanks are formed by two tracks for lateral guiding which are parallel and disposed on either side of the horizontal plane of movement of the sheet metal blanks, each guiding track interacting, on the one hand, with a lateral surface of the pads of the corresponding chain and, on the other hand, with a vertical reference surface, each guiding track is formed by rollers of vertical axis and free in rotation, the rollers bear against the lateral surface of the pads and are mounted on a support secured onto the vertical reference surface, the rollers are mounted directly on the pads and bear against the vertical reference surface, the means for placing under lateral pressure the edges to be welded of the two sheet metal blanks are formed by two tracks for lateral guiding which are parallel and disposed on either side of the horizontal plane of movement of the sheet metal blanks, each guiding track interacting, on the one hand, with the pads of the corresponding chain and, on the other hand, with at least one member for pushing in a direction perpendicular to the joint plane of the sheet metal blanks, each guiding track is formed by rollers of vertical axis and free in rotation, the rollers bear against the lateral surface of the pads and are mounted on a support connected to the said pushing member, the rollers are mounted directly on the pads and bear against a guide connected to the said pushing member, the said pushing member is constituted by at least one jack, the vertical pressure means are formed by a continuous belt in contact with the upper surface of the corresponding sheet metal blank and by rollers free in rotation for pressing the continuous belt onto the said upper surface, the axis of the said pressing rollers being perpendicular to the direction of movement of the continuous belt and horizontal.

Figure 2:
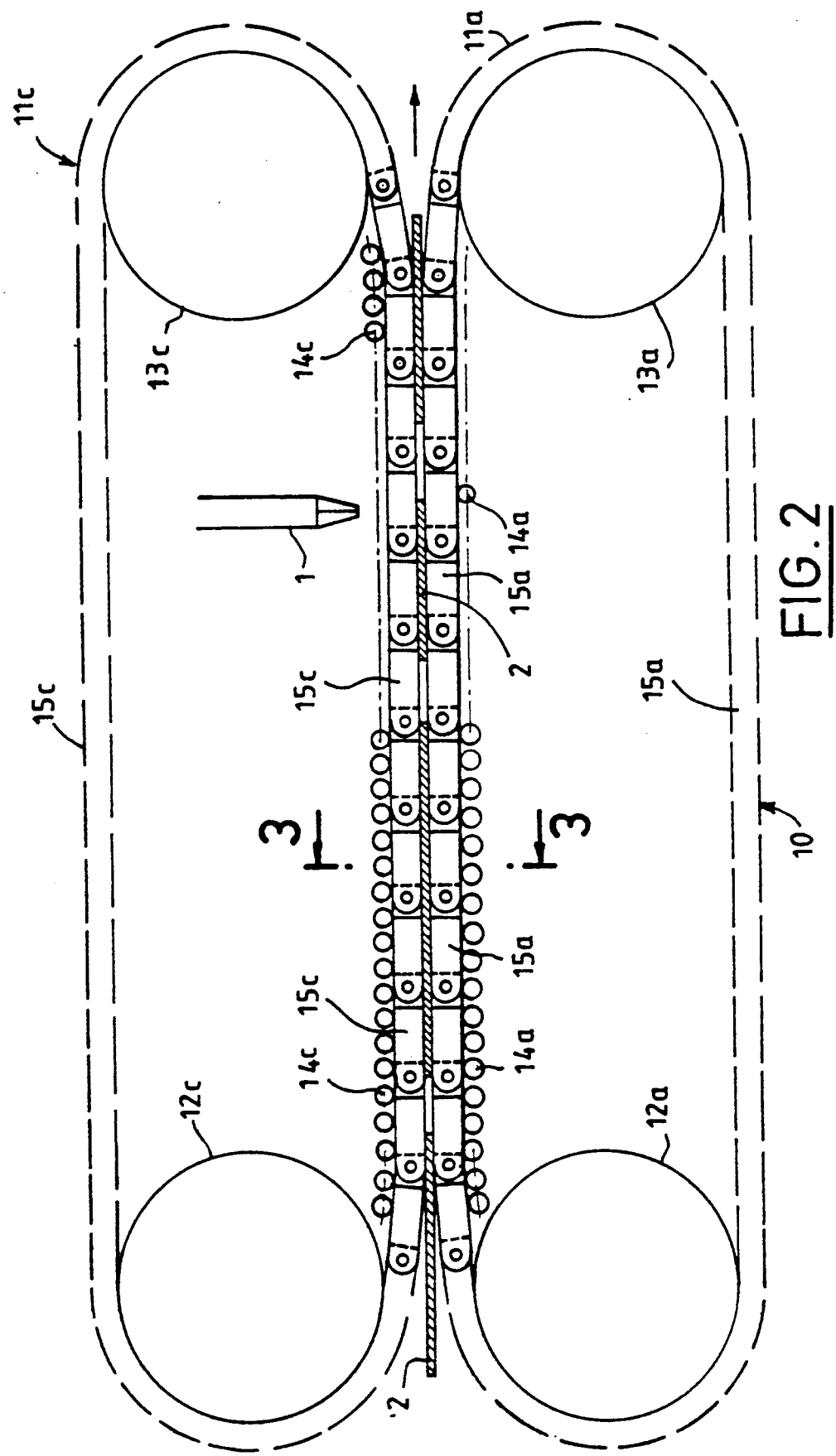
Figure 3:
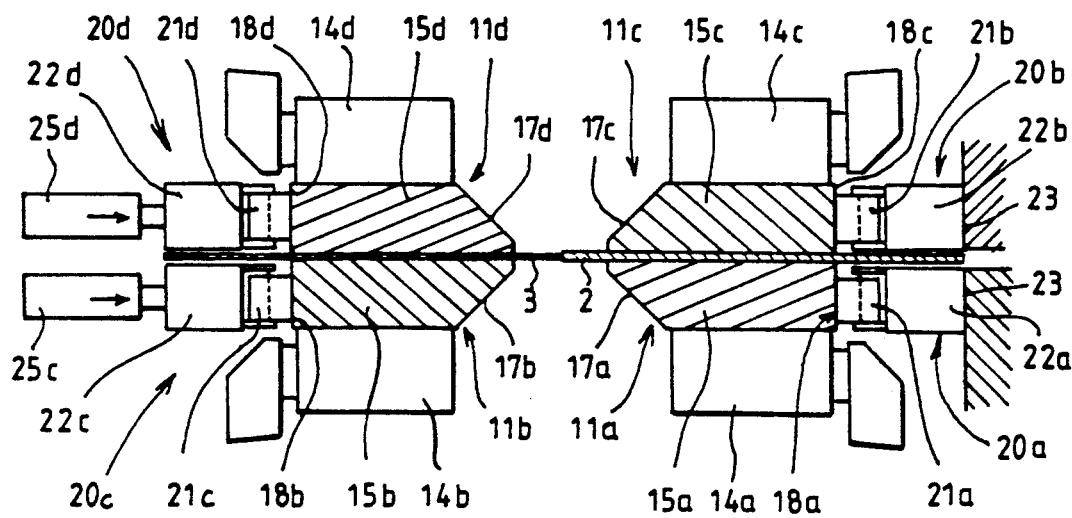
Figure 4:
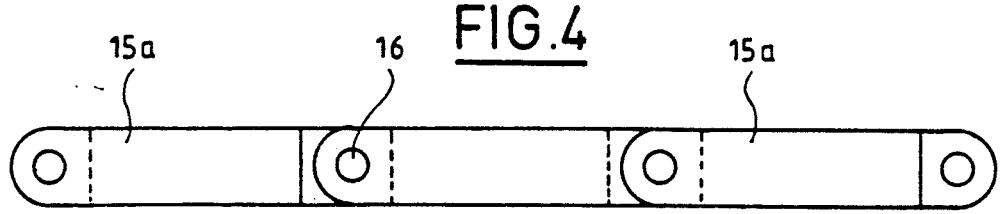
Figure 5:
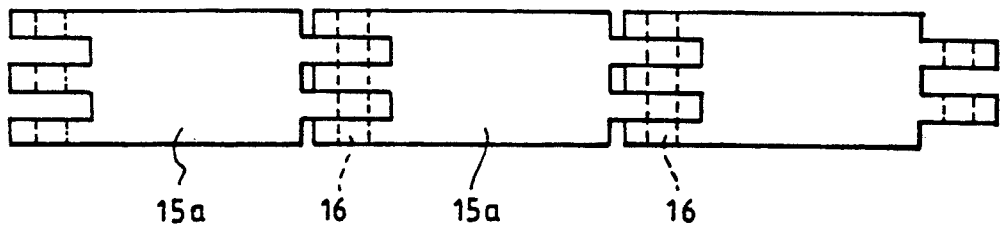
Figure 6:
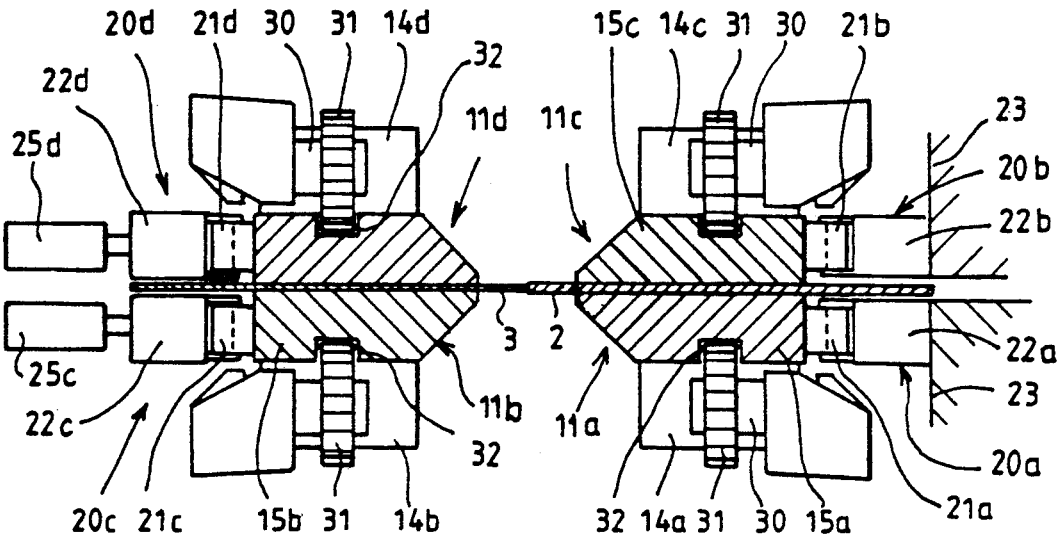
Figure 7:
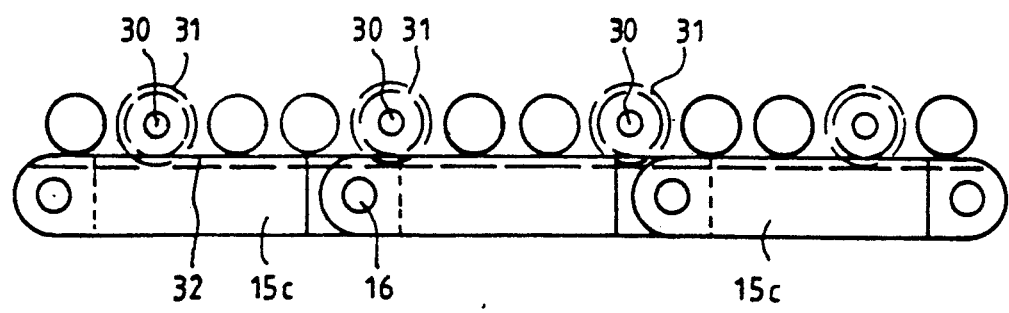

The invention will be better understood with the aid of the following description, given solely by way of example, and made with reference to the accompanying drawings, in which:

FIG. 1 is a diagrammatic view from above of an installation for welding by laser beam, equipped with the guiding and transfer device according to the present invention, FIG. 2 is a diagrammatic view in elevation of the guiding and transfer device according to the present invention, FIG. 3 is a view in cross-section along line 3—3 of FIG. 2, FIG. 4 is a diagrammatic view in elevation of several pads of a chain with pads, FIG. 5 is a plan view of several pads of a chain with pads, FIG. 6 is a diagrammatic view in cross-section of a second embodiment of the guiding and transfer device according to the present invention, FIG. 7 is a diagrammatic view in elevation of several pads of a chain with pads according to the second embodiment shown in FIG. 6.

The installation shown diagrammatically in FIG. 1 is designed for the continuous welding by a laser 1 successively of several pairs of sheet metal blanks 2 and 3 of different geometrical shapes and/or of different thicknesses, for example for the automobile industry or for the user industries of semi-finished parts.

The two sheet metal blanks 2 and 3 of each pair are placed edge to edge and move past continuously underneath the laser beam 1 with a view to their welding.

To this end, an installation for welding by laser beam comprises, after cutting out of the sheet metal blanks 2 and 3, a zone A for lateral positioning, of one of the sheet metal blanks, for example the sheet metal blank 3, with respect to the axis of the laser 1, then a zone B, for bringing the two sheet metal blanks alongside one another edge to edge and lastly a zone for guiding edge to edge the two sheet metal blanks 2 and 3 and for feeding these blanks underneath the laser 1.

In order to guarantee a good quality of weld, the positioning of the sheet metal blanks 2 and 3 must satisfy, in the welding zone, several requirements which are in particular the relative position of the edges to be welded with respect to the axis of the laser 1 and the relative pressure on these edges in order to control, or even reduce, the clearance between the said edges in the course of the movement of the sheet metal blanks 2 and 3.

To this effect, the zone C of the welding installation is equipped, on the one hand, for each sheet metal blank 2 and 3, with means for supporting the sheet metal blank 2 or 3 along a horizontal reference plane and movable horizontally in the direction of the laser and with means for vertical pressing of the sheet metal blank 2 or 3 onto the support means and movable horizontally in synchronisation with the said support means for the movement by adherence of the sheet metal blanks 2 and 3 and, on the other hand, with means for maintaining in reference along a vertical plane the edge to be welded of one of the sheet metal blanks 2 or 3 in the axis of the laser beam and with means for placing under lateral pressure the edges to be welded of the two sheet metal blanks 2 and 3.

As shown in FIGS. 2 and 3, the means for supporting the sheet metal blank 2 are formed by a chain of pads 11a which constitutes a continuous area of contact with the lower surface of the sheet metal blank 2 and which forms a loop in a plane perpendicular to the sheet metal blanks 2 and 3.

The chain of pads 11a is borne by a pair of wheels 11a and 13a each disposed at one end of the belt.

The means for supporting the sheet metal blank 2 also comprise, in the zone for maintaining the sheet metal blank 2, cylindrical rollers 14a of straight generatrix and relatively close to one another, the axis of rotation of the said rollers being perpendicular to the direction of movement of the chain with pads 11a and horizontal.

These rollers 14a free in rotation support the chain with rollers 11a so that the surface of the chain with rollers 11a in contact with the lower surface 2 determines a horizontal reference plane for the positioning of the said blank.

The chain 11a comprises pads 15a of parallel-epipedic general shape and articulated with one another by means of spindles 16, as shown in FIGS. 4 and 5.

At least three rollers 14a are in contact with each pad 15a.

The driving of the chain with pads 11a is performed for example by a speed-reducing system not shown and connected to one of the wheels 12a or 13a.

The means for supporting the sheet metal blank 3 (FIG. 3) are identical to the means for supporting the sheet metal blank 2 and are formed by a chain with pads 11b which constitutes a continuous area of contact with the lower surface of the sheet metal blank 3 and which forms a loop in a plane perpendicular to the sheet metal blanks 2 and 3.

In the zone for maintaining the sheet metal blank 3, the chain with pads 11b also bears against cylindrical rollers 14b of straight generatrix and relatively close to one another, the axis of rotation of the said rollers being perpendicular to the direction of movement of the chain with pads 11b and horizontal.

Thus, the surface of the chain with pads 11b in contact with the lower surface of the sheet metal blank 3 determines a horizontal reference plane merged with the horizontal reference plane of the sheet metal blank 2 so that the sheet metal blanks 2 and 3 are perfectly aligned.

The chain 11b comprises pads 15b of parallel-epipedic general shape and articulated with one another by means of spindles 16.

At least three rollers 14b are in contact with each pad 15b.

The driving of the chain with pads 11b is performed for example by a speed-reducing system.

The means for vertical pressing of the sheet metal blank 2 onto the chain with pads 11a are formed by a chain with pads 11c which constitutes an area of continuous contact with the upper surface of the sheet metal blank 2 and forms a loop in a plane perpendicular to the sheet metal blanks 2 and 3.

The chain with pads 11c is borne by a pair of wheels 12c and 13c each disposed at one end of the loop.

The means for vertical pressing of the sheet metal blank 2 also comprise, in the zone for maintaining the sheet metal blank 2, rollers 14 of straight generatrix and relatively close to one another, the axis of rotation of the said rollers being perpendicular to the direction of movement of the chain with pads 11c and horizontal.

The chain 11c comprises pads 15c of parallel-epipedic general shape and articulated with one another by means of spindles 16.

The driving of the chain with pads 11c is performed for example by a speed-reducing system.

These rollers 14c free in rotation are positioned so that they exert a vertical superficial pressure on the pads 15c of the chain 11c so as to grip the sheet metal blank 2 between the pads 15a and 15c.

At least three rollers 14c are in contact with each pad 15c at places spaced regularly apart, distributing the compression force on the sheet metal blank 2, so as to maintain a good inherent flatness of the pads 15c and to permit a distribution of the force by several linear contacts.

The means for vertical pressing of the sheet metal blank 3 are identical and also comprise a chain with pads 11d constituting an area of continuous contact with the upper surface of the sheet metal blank 3 and which forms a loop in a plane perpendicular to the sheet metal blanks 2 and 3.

The chain with pads 11d is also borne by a pair of wheels and its driving is performed for example by a speed-reducing system.

The chain 11d comprises pads 15d of parallel-epipedic general shape and articulated with one another by means of spindles 16.

The means for vertical pressing of the sheet metal blank 3 onto the pads 15b of the chain 11b also comprise cylindrical rollers 14d of straight generatrix and relatively close to one another, the axis of rotation of the said rollers being perpendicular to the direction of movement of the chain with pads 11d and horizontal.

The position of the rollers 14d is such that they exert a vertical superficial pressure on the pads 15d of the chain 11d so as to grip the sheet metal blank 3 between the pads 15b and 15d.

At least three rollers 14d are in contact with each pad 15d at places spaced regularly apart, thus distributing the compression force on the sheet metal blank 3.

The pads 15a, 15b, 15c and 15d of the chains 11a, 11b, 11c and 11d are identical and for example of steel. The surface of these pads in contact with the sheet metal blanks 2 or 3 is covered with a layer for example of polymer so as to avoid any sliding of the said pads with the said sheet metal blanks.

As shown in FIG. 3, the pads 15a and 15c leave with the opposite pads 15b and 15d a space sufficient for the positioning of the laser and the welding of the edges of the sheet metal blanks 2 and 3.

Moreover, the lateral surface 17a, 17b, 17c, 17d of the pads 15a, 15b, 15c, 15d respectively directed towards the edges to be welded of the sheet metal blanks 2 and 3 is bevelled, whereas the opposite surface 18a, 18b, 18c, 18d is flat and vertical.

Each sheet metal blank 2 and 3 is progressively gripped between the pads 15a, 15b, 15c, 15d, then guided and carried along by adherence between these pads by virtue of the superficial pressure exerted by the rollers 14c and 14d.

The chains with pads 11a, 11b, 11c, 11d are driven in synchronisation with one another, this serving to feed the sheet metal blanks 2 and 3 in the direction of the welding, without any possible sliding of the said sheet metal blanks with respect to the pads under pressure.

The guiding and transfer device according to the present invention also comprises means for maintaining in reference along a vertical plane the edge to be welded of one of the sheet metal blanks 2 or 3 in the axis of the laser beam and means for placing under lateral pressure the edges to be welded of sheet metal blanks 2 and 3.

These means for maintaining in reference and for placing under lateral pressure are disposed on either side of the joint plane of the sheet metal blanks 2 and 3 and each interact with one of these sheet metal blanks.

The means for maintaining in reference along a vertical plane the edge to be welded of one of the sheet metal blanks, for example of the sheet metal blank 2, are formed by two tracks 20a and 20b for lateral guiding which are parallel and disposed on either side of the horizontal plane of the sheet metal blanks 2 or 3.

As shown in FIG. 3, the guiding track 20a is formed by rollers 21a of vertical axis and free in rotation, the said rollers 21a bearing against the lateral surface 18a of the pads 15a and mounted on a support 22a secured on a vertical reference surface 23.

The guiding track 20b is equally formed by rollers 21b of vertical axis and free in rotation, the said rollers 21b bearing against the lateral surface 18c of the pads 15c and mounted on a support 22b secured on the vertical reference surface 23.

According to a variant, the rollers 21a and 21b may be mounted directly on the pads 15a and 15b respectively and may bear against the vertical reference surface 23.

This disposition makes it possible, by virtue of the guiding track 20a and 20b and of the reference surface 23, to maintain the edge to be welded of the sheet metal blank 2, previously positioned in the positioning zone A of the installation, in the axis of the laser 1.

The means for placing under lateral pressure the edges to be welded of the two sheet metal blanks 2 and 3 are formed by two tracks 20c and 20d for lateral guiding which are parallel and disposed on either side of the horizontal plane of movement of the said sheet metal blanks.

The guiding track 20c interacts, on the one hand, with the pads 15b of the chain 11b and, on the other hand, with at least one member 25 for pushing in a direction perpendicular to the joint plane of the sheet metal blanks 2 and 3.

The guiding track 20d interacts, on the one hand, with the pads 15d of the chain 11d and, on the other hand, with at least one member 25d for pushing in a direction perpendicular to the joint plane of the sheet metal blanks 2 and 3.

The guiding track 20c is formed by rollers 21c of vertical axis and free in rotation, the said rollers 21c bearing against the lateral surface 18b of the pads 15b and mounted on a support 22c connected to the pushing member 25c.

The guiding track 20d is formed by rollers 21d of vertical axis and free in rotation, the said rollers 21d bearing against the lateral surface 18d of the pads 15d and mounted on a support 22d connected to the pushing member 25d.

According to a variant, the rollers 21c and 21d may be mounted directly on the pads 15b and 15d respectively and may bear against a guide connected to the said pushing members 25c and 25d.

The pushing members 25c and 25d are constituted for example by jacks.

FIGS. 6 and 7 show another embodiment of the means for driving the chains with pads 11a, 11b, 11c and 11d.

In this case, the means for driving each chain are formed by motive rollers 30 interposed between the support or pressing rollers 14a, 14b, 14c or 14d so that at least one motive roller 30 is in contact with a pad 15a, 15b, 15c or 15d.

The motive rollers 30 comprise a pinion 31 meshing with a rack 32 provided on the surface of the pads 15a, 15b, 15c or 15d opposite to the surface in contact with the sheet metal blank 2 or 3.

According to a variant, the means for placing the sheet metal blanks 2 and 3 under vertical pressure may be formed by a continuous belt in contact with the upper surface of the corresponding sheet metal blank 2 or 3 and by rollers free in rotation for pressing the continuous belt on the said upper surface.

The device according to the present invention makes it possible to control the clearance between the edges to be welded of the two sheet metal blanks in the course of their movement during the entire welding operation and to prevent the edges to be welded from moving apart because of the expansion of the sheet metal blanks during this welding.

The lateral pressure exerted on the pads is produced by the jacks. These jacks in transmitting their forces produce movements only when the edges are not in contact; the force applied is balanced by the pressure of contact between the blanks, while avoiding a relative sliding between the sheet metal blanks and the pads.

I claim:

1. Device for guiding and for transfer of at least two sheet metal blanks (2, 3) to be welded edge to edge, particularly in an installation for welding by laser beam, characterised in that it comprises, on the one hand, for each sheet metal blank (2, 3), means (14a, 15a; 14b, 15b) for supporting the sheet metal blank (2, 3) along a horizontal reference plane and movable horizontally in the direction of the laser beam and means (14c, 15c; 14d, 15d) for vertical pressing of the sheet metal blank (2, 3) onto the support means (14a, 15a; 14b, 15b) and movable horizontally in synchronisation with the said support means for the movement by adherence of the sheet metal blanks (2, 3) and, on the other hand, means (20a, 20b) for maintaining in reference along a vertical plane the edge to be welded of one of the sheet metal blanks (2, 3) in the axis of the laser beam and means (20c, 20d, 25c, 25d) for placing under lateral pressure the edges to be welded of the two sheet metal blanks (2, 3).

2. Device according to claim 1, characterised in that the support means are formed by a chain with articulated pads (11a, 11b) constituting an area of continuous contact with the lower surface of the corresponding sheet metal blank (2, 3) and by rollers (14a, 14b) free in rotation supporting the corresponding chain with pads (11a, 11b), the axis of rotation of the said rollers (14a, 14b) being perpendicular to the direction of movement of the chain with pads (11a, 11b) and horizontal.

3. Device according to claim 1, characterised in that the vertical pressure means are formed by a chain with articulated pads (11c, 11d) constituting an area of continuous contact with the upper surface of the corresponding sheet metal blank (2, 3) and by rollers (14c, 14d) free in rotation for pressing the chain with pads (11c, 11d) onto the said upper surface, the axis of rotation of the said rollers (14c, 14d) being perpendicular to the direction of movement of the chain with pads (11c, 11d) and horizontal.

4. Device according to claim 2 or 3, characterised in that at least three rollers (14a, 14b, 14c, 14d) are in contact simultaneously with a pad (15a, 15b, 15c, 15d) of each chain with pads (11a, 11b, 11c, 11d).

5. Device according to claim 2 or 3, characterised in that each chain with pads (11a, 11b, 11c, 11d) forms a loop in a plane perpendicular to the said sheet metal blanks (2, 3) and comprises means for driving in rotation.

6. Device according to claim 2 or 3, characterised in that the means for driving each chain with pads (11a, 11b, 11c, 11d) are formed by motive rollers (30, 31) interposed between the said support or pressing rollers (14a, 14b, 14c, 14d), at least one motive roller (30, 31) being in contact with a pad (15a, 15b, 15c, 15d).

7. Device according to claim 6, characterised in that the motive rollers comprise a pinion (31) meshing with a rack (32) provided on the surface of the pads (15a, 15b, 15c, 15d) opposite to the surface in contact with the sheet metal blank (2, 3).

8. Device according to claim 2 or 3, characterised in that each pad (15a, 15b, 15d, 15d) comprises on its surface in contact with the corresponding sheet metal blank (2, 3) a layer of a material ensuring a coefficient of friction sufficient to create adherence with the corresponding sheet metal blank, for example a polymer.

9. Device according to claim 1, characterised in that the means (20a, 20b) for maintaining in reference along a vertical plane the edge to be welded of one of the sheet metal blanks (2, 3) and the means (20c, 20d, 25c, 25d) for placing under lateral pressure the edges to be welded of the two sheet metal blanks (2, 3) are disposed on either side of the joint plane of the sheet metal blanks (2, 3) and each interact with one of these sheet metal blanks (2, 3).

10. Device according to claim 1, characterised in that the means for maintaining in reference along a vertical plane the edge to be welded of one of the sheet metal blanks (2, 3) are formed by two tracks (20a, 20b) for lateral guiding which are parallel and disposed on either side of the horizontal plane or movement of the sheet metal blanks (2, 3), each guiding track (20a, 20b) interacting, on the one hand, with a lateral surface (18a, 18c) of the pads (15a, 15c) of the corresponding chain (11a, 11c) and, on the other hand, with a vertical reference surface (23).

11. Device according to claim 10, characterised in that each guiding track (20a, 20b) is formed by rollers (21a, 21b) of vertical axis and free in rotation.

12. Device according to claim 11 characterised in that the rollers, (21a, 21b) bear against the lateral surface (18a, 18c) of the pads (15a, 15c) and are mounted on a support (22a, 22b) secured on the vertical reference surface (23).

13. Device according to claim 11, characterised in that the rollers (21a, 21b) are mounted directly on the pads (15a, 15c) and bear against the vertical reference surface (23).

14. Device according to claim 1, characterised in that the means for placing under lateral pressure the edges to be welded of the two sheet metal blanks (2, 3) are formed by two tracks (20c, 20d) for lateral guiding which are parallel and disposed on either side of the horizontal plane of movement of the sheet metal blanks (2, 3), each guiding track (20c, 20d) interacting, on the one hand, with the pads (15b, 15d) of the corresponding chain (11b, 11d) and, on the other hand, with at least one member (25c, 25d) for pushing in a direction perpendicular to the joint plane of the sheet metal blanks (2, 3).

15. Device according to claim 14, characterised in that each guiding track (20c, 20d) is formed by rollers (21c, 21d) of vertical axis and free in rotation.

16. Device according to claim 15, characterised in that the rollers (21c, 21d) are mounted directly on the pads (15b, 15d) and bear against a guide connected to the said pushing member (25c, 25d).

17. Device according to claim 15, characterised in that the rollers (21c, 21d) are mounted directly on the pads (15b, 15d) and bear against a guide connected to the said pushing member (25c, 25d).

18. Device according to claim 14, characterised in that the said pushing member (25c, 25d) is constituted by at least one jack.

19. Device according to claim 1, characterised in that the vertical pressure means are formed by a continuous belt in contact with the upper surface of the corresponding sheet metal blank (2, 3) and by rollers free in rotation for pressing the continuous belt onto the said upper surface, the axis of the said rollers being perpendicular to the direction of movement of the continuous belt and horizontal.

* * * * *